US007704472B2

(12) United States Patent
Murakami et al.

(10) Patent No.: US 7,704,472 B2
(45) Date of Patent: Apr. 27, 2010

(54) AIR POLLUTANT CONTROL SYSTEM AND METHOD FOR REMOVING MERCURY IN FLUE GAS

(75) Inventors: Moritoshi Murakami, Hiroshima (JP); Nobuyuki Ukai, Hiroshima (JP); Tatsuto Nagayasu, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/362,849

(22) Filed: Jan. 30, 2009

(65) Prior Publication Data

US 2009/0269262 A1 Oct. 29, 2009

(30) Foreign Application Priority Data

Apr. 25, 2008 (JP) ............................. 2008-116350

(51) Int. Cl.
B01D 53/64 (2006.01)
B01D 53/74 (2006.01)
G05D 21/00 (2006.01)

(52) U.S. Cl. ................. 423/210; 423/239.1; 423/242.1; 423/240 R; 422/105; 422/108; 422/111; 422/168; 422/169; 422/170; 422/171; 422/172

(58) Field of Classification Search ................. 423/210, 423/240 R, 242.1, 239.1; 422/105, 108, 422/111, 168–172
See application file for complete search history.

(56) References Cited

U.S. PATENT DOCUMENTS 6,638,485 B1 10/2003 Iida et al.

2007/0202020 A1 8/2007 Honjo et al.

FOREIGN PATENT DOCUMENTS

| EP | 1 854 529 A1 | 11/2007 |
| JP | 10-230137 A * | 9/1998 |
| JP | 2000-325747 A | 11/2000 |
| JP | 3-698916 B2 * | 9/2005 |
| JP | 2006-263700 A | 10/2006 |
| JP | 2007-167743 A | 7/2007 |

OTHER PUBLICATIONS

English abstract of JP 3-935,547 B2 published on Jun. 27, 2007.*
International Search Report of PCT/JP2008/071052, date of mailing date Feb. 17, 2009.

* cited by examiner

Primary Examiner—Timothy C Vanoy
(74) Attorney, Agent, or Firm—Westerman, Hattori, Daniels & Adrian, LLP

(57) ABSTRACT

An air pollutant control system comprises: a denitration apparatus that reduces nitrogen oxide in flue gas discharged from a coal combustion boiler, and that sprays hydrogen chloride into the gas to oxidize mercury, an air heater that recovers heat in gas, a dust collector that reduces dust in gas, a desulfurization apparatus that reduces sulfur oxide in gas from which the dust has been reduced, a hydrogen chloride vaporizer that evaporates concentrated hydrochloric acid to obtain the hydrogen chloride, and a hydrochloric acid neutralization tank where dilute hydrochloric acid discharged from the hydrogen chloride vaporizer or the concentrated hydrochloric acid is neutralized with an alkali agent. Neutralized chloride is supplied to a fuel feeder, mixed with a fuel, and then burned as a fuel in a boiler to produce hydrogen chloride in flue gas. Together with sprayed hydrogen chloride derived from the hydrogen chloride vaporizer, the mercury is reduced.

6 Claims, 7 Drawing Sheets

AIR POLLUTANT CONTROL SYSTEM AND METHOD FOR REMOVING MERCURY IN FLUE GAS

BACKGROUND OF THE INVENTION

1. Field of the Invention

The present invention relates to a flue gas treatment system that reduces mercury in flue gas discharged from a boiler, and to a method for removing mercury in flue gas.

2. Description of the Related Art

Conventionally, various systems for removing mercury in flue gas have been considered because, for example, coal combustion boilers serving as combustion apparatuses in power stations and other facilities discharge flue gas containing highly toxic mercury.

A coal combustion boiler generally includes a wet desulfurization apparatus for removing sulfur content in flue gas. In flue gas treatment facilities including such a boiler provided with a desulfurization apparatus that serves a flue gas treatment apparatus, as chlorine (Cl) content increases in flue gas, the ratio of water-soluble divalent metallic mercury increases. This facilitates collection of the mercury with the desulfurization apparatus, as is well known.

In recent years, various proposals have been made on denitration apparatuses that reduce NOx, and on methods and apparatuses for treating the metallic mercury in combination with a wet desulfurization apparatus that uses an alkali absorbing solution as SOx absorbent.

As treatment of metallic mercury in flue gas, removal methods using an absorbent such as activated carbon or a selenium filter have been known. These methods, however, require special means for absorption removal, and are not suitable for treatment of a large volume of flue gas, such as flue gas in power stations. As a method for treating metallic mercury in a large volume of flue gas, methods have been proposed that include: gas-atomizing a chlorinating agent in a flue at an upstream process in a high-temperature denitration apparatus, oxidizing (chlorinating) the mercury on a denitration catalyst to be aqueous hydrogen chloride, and then absorbing it in a downstream wet desulfurization apparatus (for example, see Japanese Patent Application Laid-open No. 10-230137 and Japanese Patent No. 3935547). Apparatuses and techniques for spraying gas in a flue have been commercialized as $NH_3$ spray devices of denitration apparatuses, and the same means can be used for gas atomization of a chlorinating agent.

FIG. 7 depicts an example of a conventional mercury removal system. As shown in FIG. 7, a related-art flue gas treatment system 100 includes: a denitration apparatus 13 that reduces nitrogen oxide in flue gas 12 discharged from a coal combustion boiler 11 that supplies coal as a fuel F, and that sprays vaporized hydrogen chloride 23 into the gas to oxidize mercury; an air heater 14 that recovers heat in gas from which the nitrogen oxide has been reduced; a dust collector 15 that reduces dust in gas from which the heat has been collected; a desulfurization apparatus 16 that reduces sulfur oxide in gas from which the dust has been reduced; a smoke-stack 17 from which desulfurized gas is discharged to the outside; and a hydrogen chloride vaporizer 21 that produces the vaporized hydrogen chloride 23. In FIG. 7, indicated by reference numerals 41 and 42 are mercury monitors, 43 is an redox potential measurement controller (an oxidation-reduction potential (ORP) controller), 45 is gypsum slurry containing mercury discharged from the desulfurization apparatus, 46 is a belt filter, 47 is gypsum, 60 is a lime feeder, and 61 is lime (particles or slurry).

A proposal has been made of supplying, instead of spraying hydrogen chloride into flue gas, chlorine compounds during combustion in the boiler so as to produce hydrogen chloride (Japanese Patent No. 3698916).

When employing the mercury removal systems that spray hydrogen chloride or the like as proposed in Japanese Patent Application Laid-open No. 10-230137 and Japanese Patent No. 3935547, 35% hydrochloric acid is evaporated in the hydrogen chloride vaporizer. Accordingly, a large amount of concentrated hydrochloric acid is required, and the resulting by-product, i.e., dilute hydrochloric acid, is discharged by an amount equivalent to about 80% of the concentrated hydrochloric acid (35% hydrochloric acid). This poses a problem that the dilute hydrochloric acid results in a waste product for the power station.

The chlorine concentration varies depending on the type of coal used in the power station (i.e., coal type). Even when a coal type with high chloride concentration is used, a large amount of 35% concentrated hydrochloric acid is necessary, and dilute hydrochloric acid is discharged by an amount equivalent to 80% of the 35% concentrated hydrochloric acid. Thus, to establish recycling plants as ancillary facilities to treat the dilute hydrochloric acid as a waste product, a set of plants needs to be established. This increases costs for establishing and maintaining the plants.

It is also considered to establish recycling plants within power generating facilities. This requires, however, substantial addition in treatment processes because non volatile materials are circulated and concentrated in the treatment of the dilute hydrochloric acid.

In the proposal of Japanese Patent No. 3698916, hydrogen chloride is produced by combustion in the boiler. The efficiency of converting chlorine compounds to hydrogen chloride in the boiler varies depending on the combustion in the boiler, and therefore is not constant. In addition, the mercury concentration in flue gas is not constant all the time. This poses a problem that hydrogen chloride cannot be supplied by a constant amount so that mercury is securely reduced as mercury chloride.

Thus, there is a demand to establish an inexpensive mercury removal system that disposes no dilute hydrochloric acid discharged as a by-product, and that can stably reduce mercury.

The present invention is made in view of the foregoing, and has an object to provide an air pollutant control system and a method for removing mercury in flue gas that reduce operating costs.

SUMMARY OF THE INVENTION

An object of the present invention is to at least partially solve the problems in the conventional technology.

According to an aspect of the present invention, an air pollutant control system includes: a denitration apparatus that reduces nitrogen oxide in flue gas discharged from an industrial boiler, and that injects hydrogen chloride into the flue gas to oxidize mercury; a desulfurization apparatus that absorbs sulfur oxide in flue gas thus denitrated; a stack from which gas thus desulfurized is discharged outside; a hydrogen chloride vaporizer that produces hydrogen chloride with a supply of concentrated hydrochloric acid; and a hydrochloric acid neutralization tank where at least one of dilute hydrochloric acid discharged from the hydrogen chloride vaporizer and the concentrated hydrochloric acid is neutralized with an alkali agent. Chloride resulting from such neutralization is supplied to a fuel, and then burned in the industrial boiler to produce hydrogen chloride in flue gas, and, together with hydrogen chloride sprayed, the mercury is reduced.

According to another aspect of the present invention, an air pollutant control system includes: a spray device that sprays hydrogen chloride into flue gas discharged from a coal combustion boiler; a denitration apparatus that reduces nitrogen oxide in flue gas into which the hydrogen chloride has been sprayed, and that oxidizes mercury; an air heater that recovers heat in gas from which the nitrogen oxide has been reduced; a dust collector that reduces dust in gas from which the heat has been collected; a desulfurization apparatus that absorbs sulfur oxide in gas from which the dust has been reduced; a stack from which gas thus desulfurized is discharged outside; a hydrogen chloride vaporizer that produces hydrogen chloride with a supply of concentrated hydrochloric acid; and a hydrochloric acid neutralization tank where at least one of dilute hydrochloric acid discharged from the hydrogen chloride vaporizer and the concentrated hydrochloric acid is neutralized with an alkali agent. Neutralized chloride is supplied to a coal feeder, mixed with coal, and then burned in the coal combustion boiler, so as to produce hydrogen chloride in flue gas, and, together with hydrogen chloride sprayed, the mercury is reduced.

In the air pollutant control system, desulfurization wastewater discharged from the desulfurization apparatus, or treated wastewater obtained by removing heavy metals from the desulfurization wastewater may be supplied to the hydrochloric acid neutralization tank.

In the air pollutant control system, the air pollutant control system may further comprise a hydrogen chloride monitor that measures a concentration of hydrogen chloride between the boiler and the denitration apparatus. The chloride may be supplied under feedback control.

In the air pollutant control system, flue gas between the boiler and the denitration apparatus may have a chlorine concentration being equal to or less than 1000 ppm.

According to still another aspect of the present invention, a method for removing mercury in flue gas comprises: removing nitrogen oxide in flue gas discharged from an industrial boiler, and spraying hydrogen chloride into the flue gas, so as to oxidize mercury; neutralizing with an alkali agent dilute hydrochloric acid discharged after the hydrogen chloride is produced; and supplying neutralized chloride to a fuel, and then combustion the chlorine in the boiler to produce hydrogen chloride in flue gas, and removing the mercury together with hydrogen chloride sprayed.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE INVENTION

Exemplary embodiments of the present invention will be described in detail with reference to the accompanying drawings. The present invention is not limited by the embodiments. Constituting elements in the embodiments include elements that can be easily achieved by a person skilled in the art, or elements being substantially the same as those elements.

First Embodiment

Figure 1:
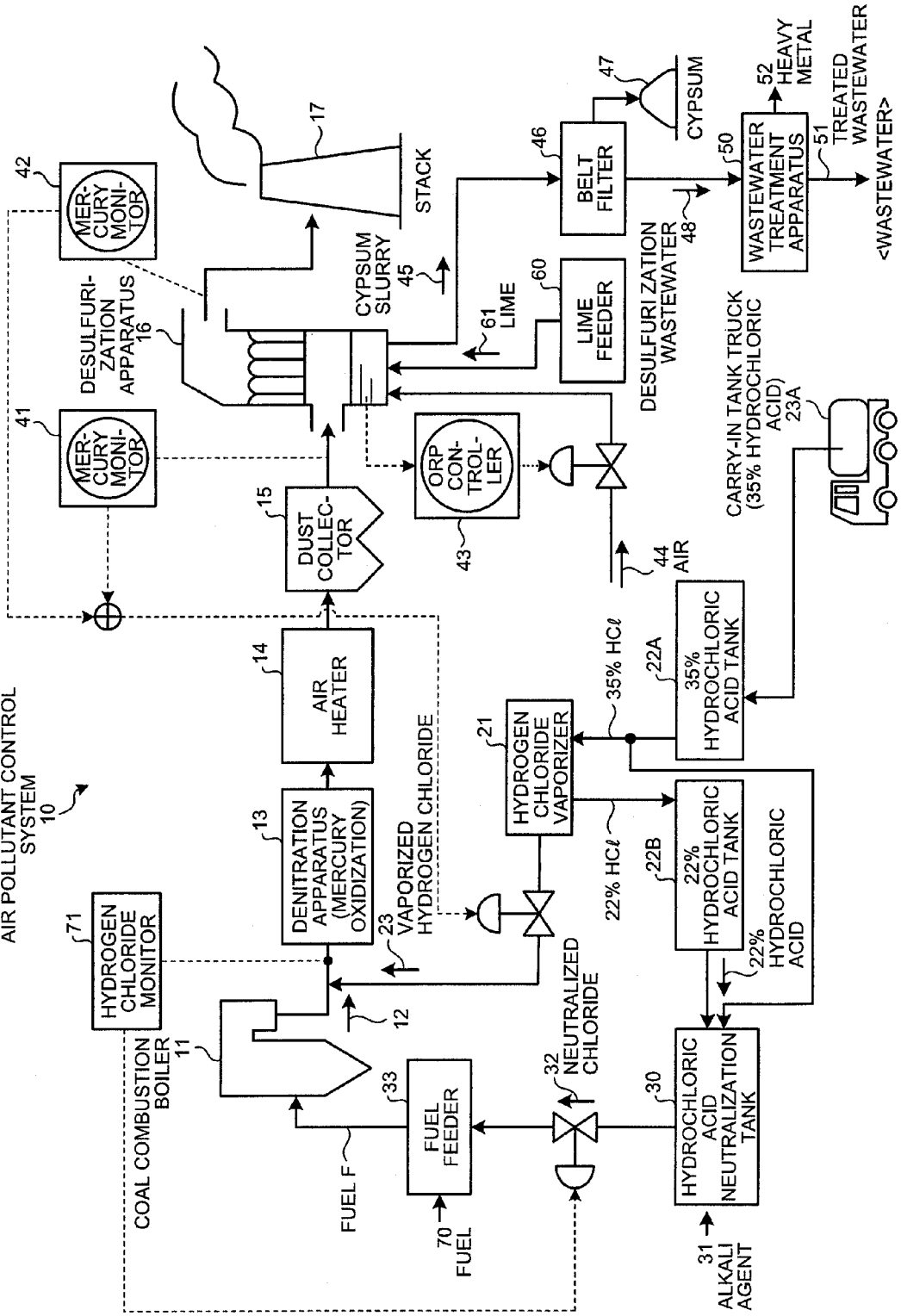
FIG. 1 is a diagram of an air pollutant control system according to a first embodiment.

FIG. 1 is a schematic diagram of an air pollutant control system according to a first embodiment. As shown in FIG. 1, an air pollutant control system 10 according to the present embodiment includes: the denitration apparatus 13 that reduces nitrogen oxide in flue gas 12 discharged from the coal combustion boiler 11, and that sprays hydrogen chloride 23 into the gas to oxidize mercury; the air heater 14 that recovers heat in gas from which the nitrogen oxide has been reduced; the dust collector 15 that reduces dust in gas from which the heat has been collected; the desulfurization apparatus 16 that reduces sulfur oxide in gas from which the dust has been reduced; the stack 17 from which desulfurized gas is discharged to the outside; the hydrogen chloride vaporizer 21 that evaporates concentrated hydrochloric acid (35% HCl) to produce hydrogen chloride 23; and a hydrochloric acid neutralization tank 30 where dilute hydrochloric acid (22% HCl) discharged from the hydrogen chloride vaporizer 21 is neutralized with an alkali agent 31. In the air pollutant control system 10, neutralized chloride (chloride is, for example, calcium chloride when calcium carbonate is used) is supplied to a fuel feeder 33 and mixed with coal as a fuel 70, and then is burned as a fuel F in the boiler 11. In this method, hydrogen chloride is produced in the flue gas, and together with hydrogen chloride sprayed from the hydrogen chloride vaporizer 21, the mercury is reduced. In FIG. 1, indicated by reference numerals 41 and 42 are mercury monitors, 43 is a redox potential measurement controller (an oxidation-reduction potential (ORP) controller), and 44 is air.

In the desulfurization apparatus 16, lime (powder or slurry) 61 is fed from a lime feeder 60, sulfur oxide in the flue gas is desulfurized, and resulting gypsum slurry 45 is discharged to the outside. Then, gypsum 47 is separated by solid-liquid separation means, such as a belt filter 46. The separate liquid, i.e., desulfurization wastewater 48, contains heavy metal 52, which is coagulated and deposited by a coagulant in a wastewater treatment apparatus 50, and discharged to the outside as treated wastewater 51.

Concentrated hydrochloric acid (35% hydrochloric acid) as a feedstock is carried in by a carry-in tank truck 23A from the outside, temporarily stored in a 35% hydrochloric acid tank 22A, and supplied to the hydrogen chloride vaporizer 21, where the hydrogen chloride 23 is evaporated. Collected dilute hydrochloric acid, obtained by evaporating the hydrogen chloride 23 and collecting it, has a concentration of about 22%, and is stored in a 22% hydrochloric acid tank 22B. The dilute hydrochloric acid is supplied to the hydrochloric acid neutralization tank 30, and neutralized with an alkali agent. As a result, chloride 32 is obtained.

In the present invention, instead of the collected dilute hydrochloric acid, the concentrated hydrochloric acid (35% hydrochloric acid) to be supplied to the hydrogen chloride vaporizer 21 may be supplied to the hydrochloric acid neutralization tank 30 alone or in combination. In particular, it is preferable to supply the concentrated hydrochloric acid (35% hydrochloric acid) when, for example, the hydrogen chloride vaporizer 21 is stopped, because hydrogen chloride can be securely produced in the flue gas discharged from the boiler 11.

In the present invention, the alkali agent is not specifically limited. Use of lime (calcium carbonate) used in the desulfurization apparatus eliminates the need to buy an alkali agent separately. Other alkali agents such as sodium hydroxide and other known alkali agents may be used.

Figure 6:
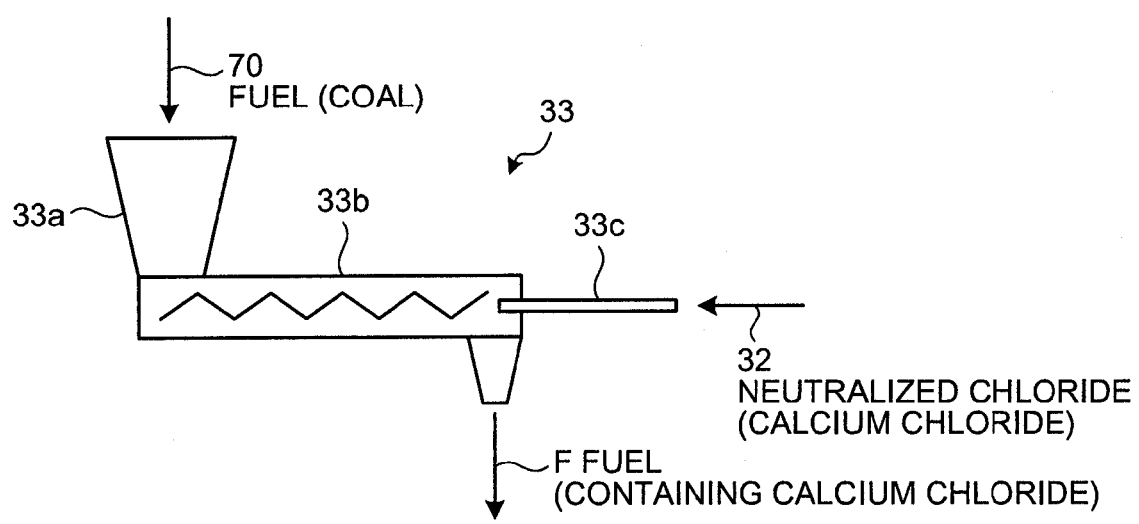
FIG. 6 is a schematic of a fuel feeder.

As the resultant chloride, calcium chloride (aqueous solution) is fed to the fuel feeder 33 through a feed pipe 33c, as shown in FIG. 6. Then, in a feeder 33b, the calcium chloride is mixed with the fuel (coal) 70 supplied from a hopper 33a, fed to the boiler 11 as the fuel (containing calcium chloride) F, and mixed and burned. During the combustion, the chloride 32 in the fuel is burned. As a result, hydrogen chloride is produced.

As such, according to the present invention, the collected dilute hydrochloric acid (22% HCl), discharged as a waste product, is neutralized in the hydrochloric acid neutralization tank 30. Further, the neutralized chloride 32 is supplied to the boiler 11 and burned to produce hydrogen chloride. Then, together with hydrogen chloride sprayed separately, it is possible to securely reduce mercury in flue gas.

This eliminates the process for transporting outside the collected dilute hydrochloric acid obtained by producing hydrogen chloride and collecting it, which has been required in related art. The collected dilute hydrochloric acid is neutralized and reutilized as chlorine compounds. Further, by combustion the chlorine compounds in the boiler, second hydrogen chloride is produced in the boiler. Then, together with first hydrogen chloride derived from the concentrated hydrochloric acid and originally fed from the hydrogen chloride vaporizer 21, it is possible to reduce mercury in flue gas. Thus, the amount of the first hydrogen chloride produced in the hydrogen chloride vaporizer 21 can be reduced by the amount of the second hydrogen chloride produced in the boiler 11. This significantly reduces the amount of the concentrated hydrochloric acid (35% HCl) bought and transported from the outside for mercury removal.

The conversion rate of converting chlorine compounds to hydrogen chloride during the combustion in the boiler is in a range of about 40% to 60% (about 50%) in general, though it varies depending on the conditions of the combustion in the boiler. As the amount of chloride 32 to be supplied to the fuel 70, it is preferable that the ratio of the chloride to be supplied relative to coal be equal to or less than 2000 mg/Kg regarding corrosion of the facilities such as the boiler 11.

For efficiently removing mercury in flue gas and considering chlorine concentration in wastewater in the system, it is preferable that the chlorine concentration in the flue gas between the boiler 11 and the denitration apparatus 13 be equal to or less than 1000 ppm. To this end, a hydrogen chloride monitor 71 for measuring a concentration of hydrogen chloride is provided between the boiler 11 and the denitration apparatus 13, so that the chloride 32 is supplied under feedback control.

This makes it possible to efficiently reduce mercury in flue gas. Further, by making the concentration of hydrogen chloride to be sprayed into the flue gas be equal to or less than 1000 ppm, it is possible to make the chlorine concentration in the treated wastewater 51 to be discharged to the outside from the desulfurization apparatus 16 be equal to or less than a predetermined value of an environmental discharge standard.

In the present invention, when coal is used as the fuel 70 supplied to the boiler 11, powder river basin (PRB) coal may be used, as well as bituminous coal. PRB coal is inexpensive and abundantly available in the United States. Compared with bituminous coal, PRB has a lower chlorine concentration, i.e., about one-tenth the chlorine concentration of bituminous coal. When using such coal with low chlorine content, hydrogen chloride is produced less. When not reutilizing the collected hydrochloric acid as in the present invention, the consumption of concentrated hydrochloric acid is more than that when bituminous coal is used as generally. In the present invention, the collected dilute hydrochloric acid (22% HCl), obtained by producing hydrogen chloride from the concentrated hydrochloric acid (35% HCl), is neutralized to be the chloride 32. Then, the chloride 32 is burned in the boiler 11 and supplemented as hydrogen chloride. In this way, the dilute hydrochloric acid can be reutilized, and the usage of the concentrated hydrochloric acid can be significantly reduced.

According to the present invention, for example, in a power station including an air pollutant control facility, dilute hydrochloric acid discharged as a by-product resulting from its air pollutant control is not disposed to the outside, but reutilized to produce hydrogen chloride in a boiler. Then, together with hydrogen chloride sprayed, mercury in flue gas is oxidized and reduced. As such, by reutilizing the dilute hydrochloric acid, the recycling efficiency can be significantly improved.

The amount of chlorine in coal significantly varies depending on the type of the coal used as a fuel for combustion in the boiler. Accordingly, the amount of hydrogen chloride to be supplied varies depending on the coal type. Even when the consumption of hydrochloric acid varies depending on the coal type, the production amount of hydrogen chloride can be adjusted by reutilizing the collected dilute hydrochloric acid.

For example, when a small power plant utilizes concentrated hydrochloric acid of 35 tons per day, dilute hydrochloric acid of about 29 tons is produced per day, which counts for 80% of the concentrated hydrochloric acid. In this case, by neutralizing the dilute hydrochloric acid in a hydrochloric acid neutralization tank and burning it in a boiler as described, there is no need to transport the dilute hydrochloric acid to the outside with discharge means such as a tank truck. Accordingly, no disposal cost is required.

As a result, costs are required only for buying concentrated hydrochloric acid. Thus, it is possible to provide a mercury removal system requiring low operating costs, for mercury removal from flue gas. In addition, the amount of concentrated hydrochloric acid to be carried in is also reduced because the collected dilute hydrochloric acid is reutilized to produce hydrogen chloride from chloride and supplement it. In this way, cost reduction is significantly achieved compared with conventional systems.

Further, no cost is required for treating the collected dilute hydrochloric acid, which has been required for every treatment of mercury. This also contributes to the significant reduction in running costs.

Figure 2:
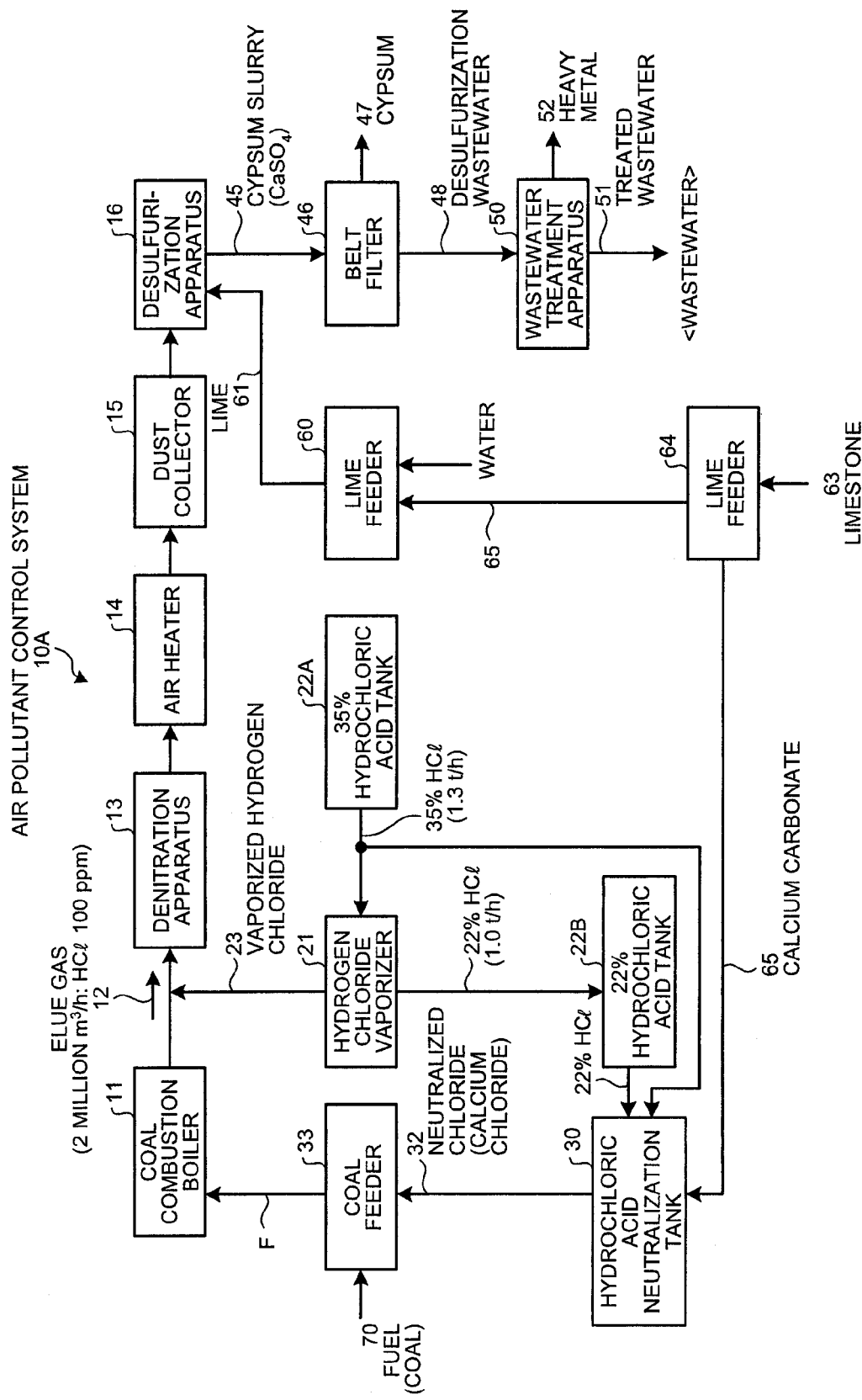
FIG. 2 is a schematic diagram of an air pollutant control system as an example of application of the first embodiment.
Figure 3:
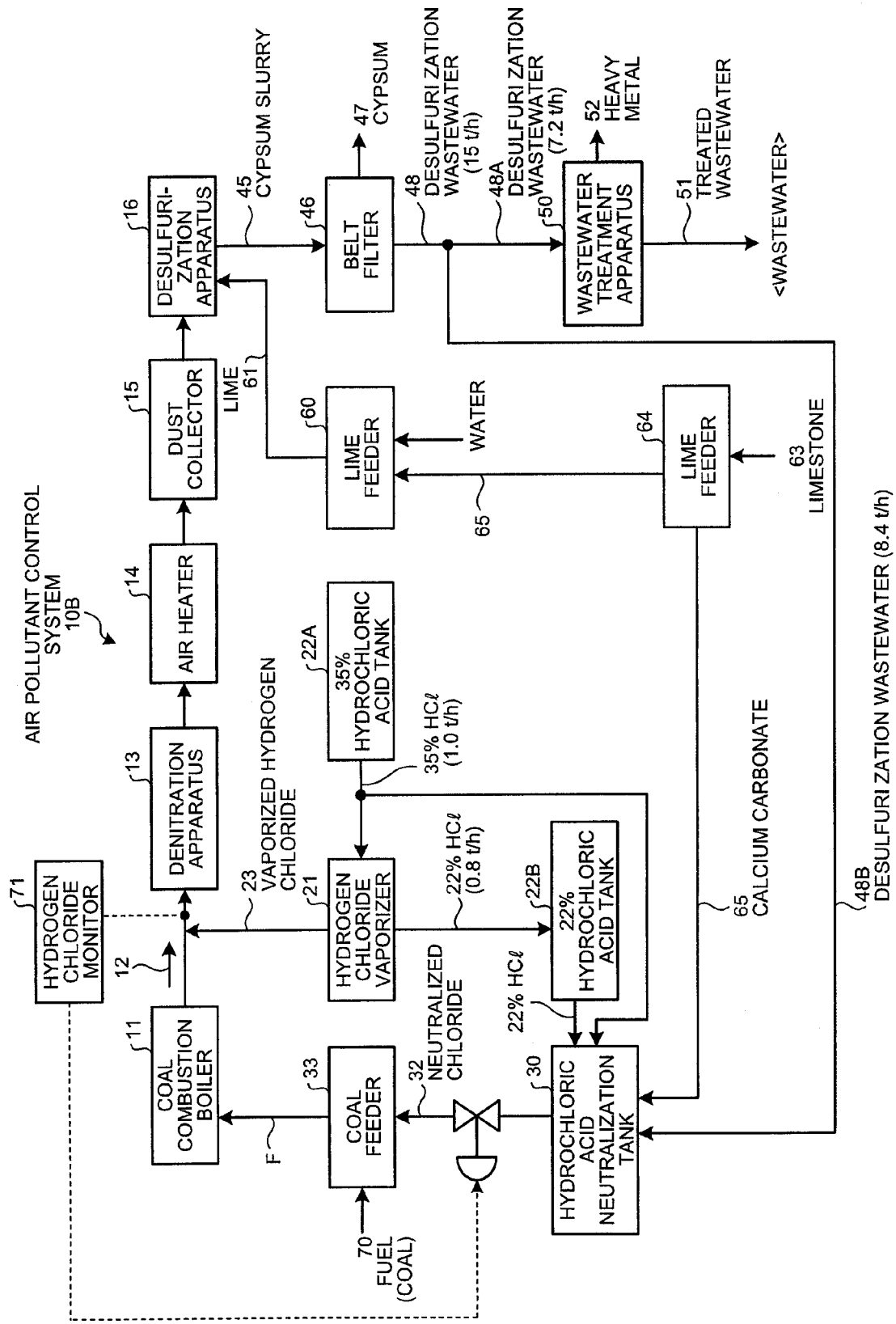
FIG. 3 is a schematic diagram of an air pollutant control system as an example of application of a second embodiment.
Figure 4:
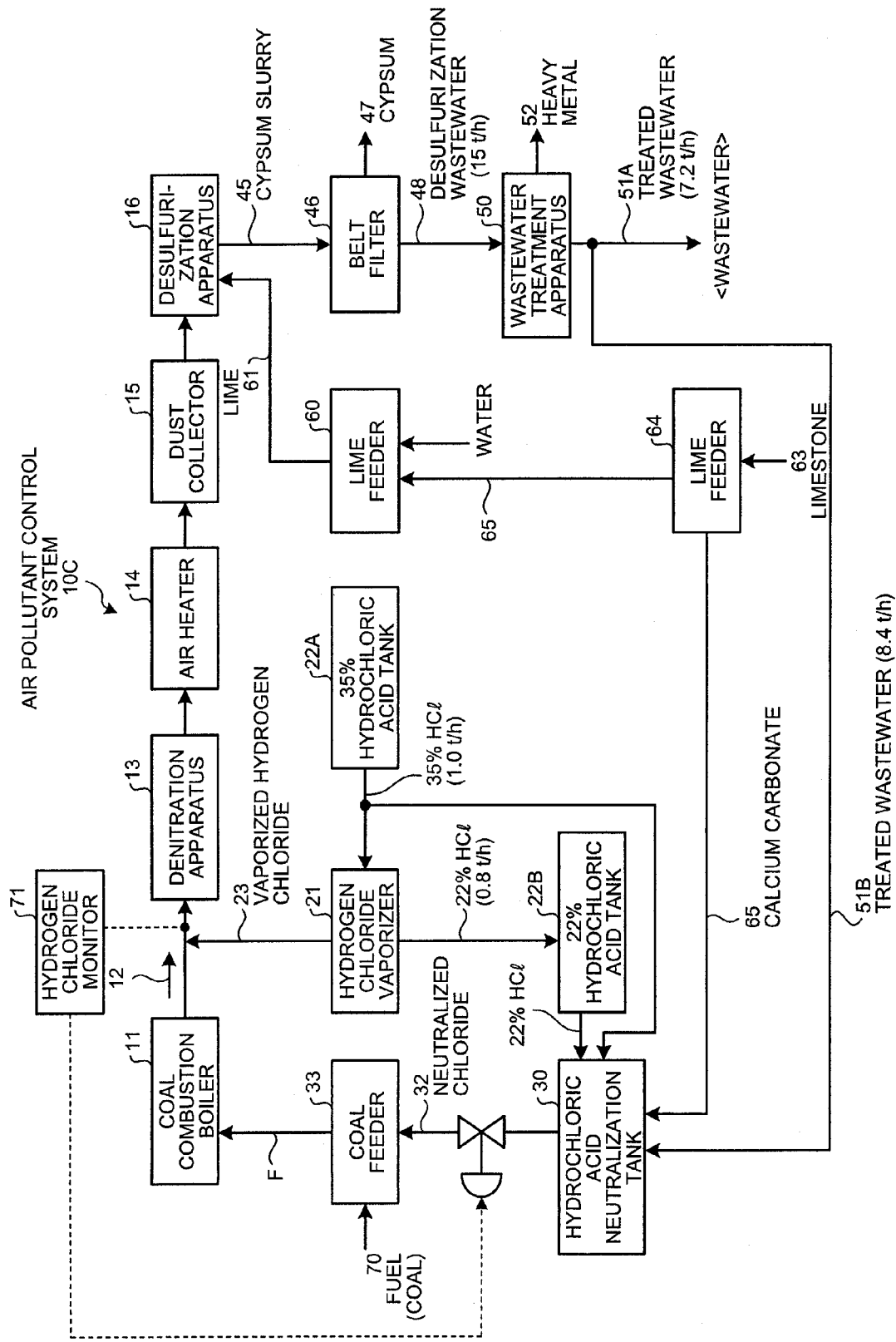
FIG. 4 is a schematic diagram of an air pollutant control system as another example of application of the second embodiment.
Figure 7:
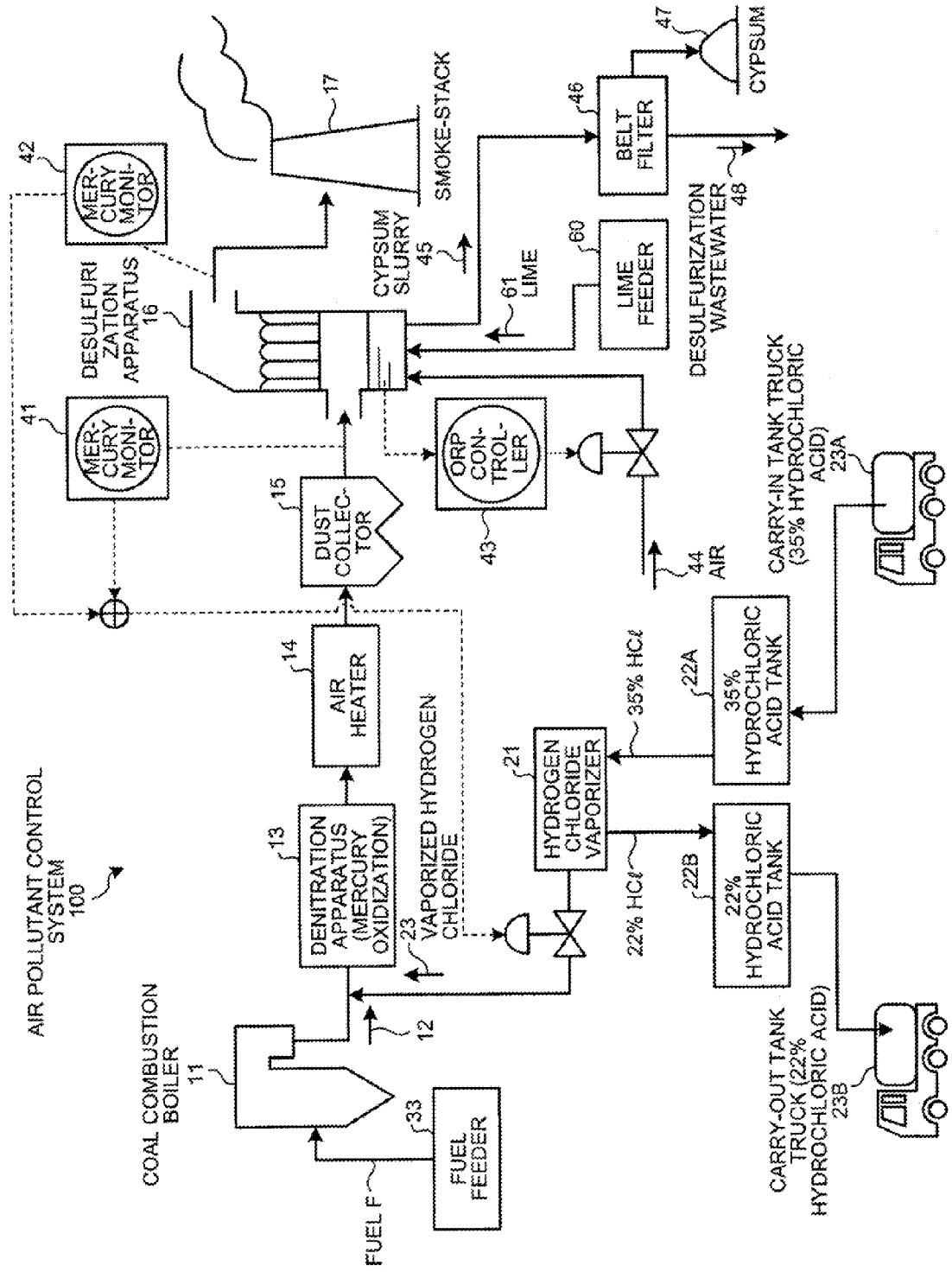
FIG. 7 is a diagram of a related-art air pollutant control system.

The following describes a power generating facility that generates power of 600 megawatts, for example, to which the present invention is applied for removing mercury in flue gas. Assume that a boiler discharges flue gas at 2 million m³ per hour. An air pollutant control system 10A shown in FIG. 2 employs, as a coal combustion boiler, the boiler of the air pollutant control system 10 shown in FIG. 1. Air pollutant control systems 10B and 10C shown in FIGS. 3 and 4 are modification examples of the air pollutant control system 10A. An air pollutant control system 100A shown in FIG. 5 is a comparative example, depicted as a schematic of the related-art air pollutant control system 100 shown in FIG. 7.

The configuration of the air pollutant control systems are the same as that shown in FIG. 1, and therefore overlapped descriptions are omitted. In FIGS. 2 to 4, indicated by a reference numeral 63 is limestone, 64 is a lime feeder, and 65 is lime (calcium carbonate).

Figure 5:
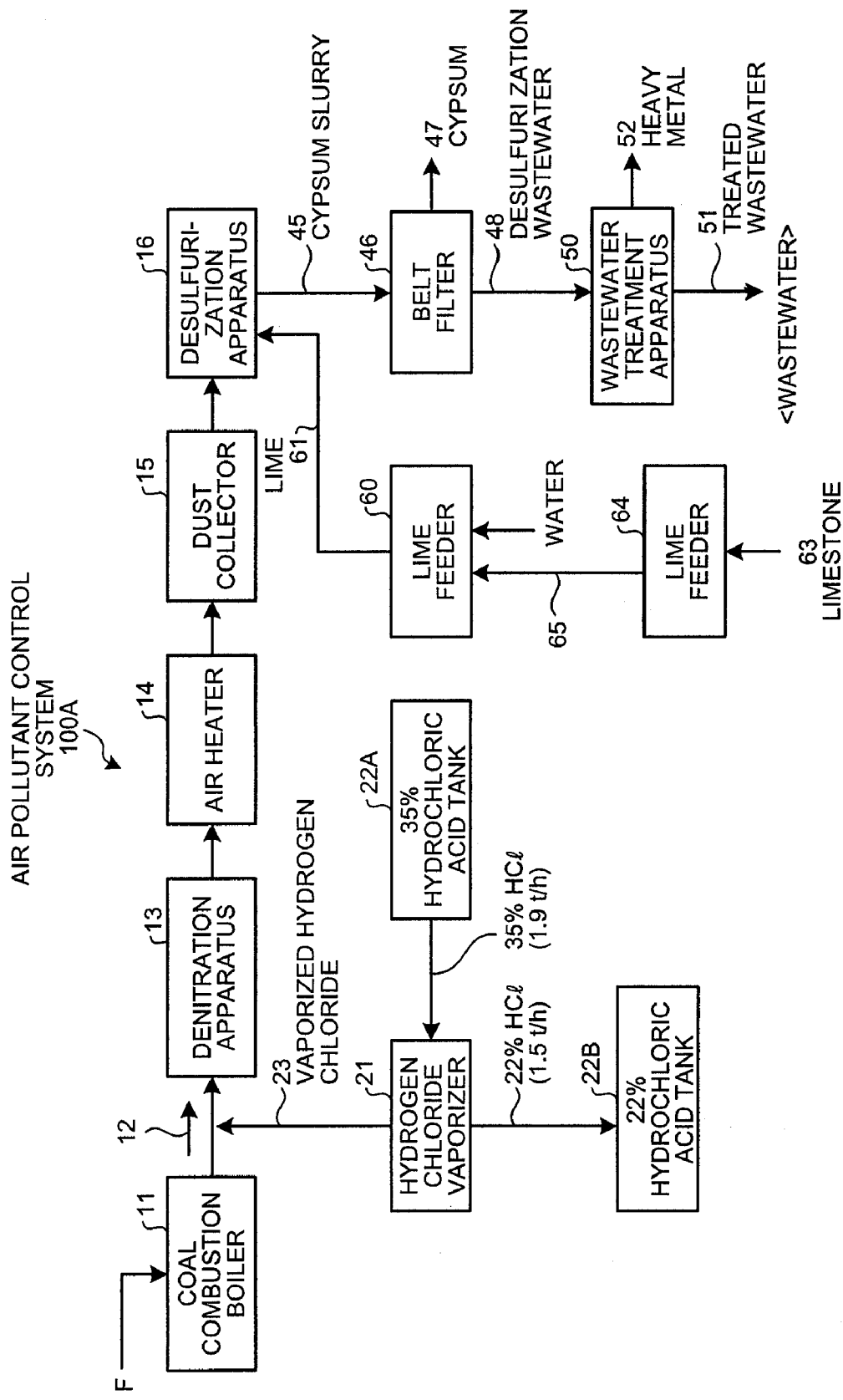
FIG. 5 is a schematic diagram of an air pollutant control system as a conventional facility.

In the air pollutant control system 100A shown in FIG. 5 as a conventional facility, when the amount of flue gas is 2 million m³ per hour, no hydrochloric acid is reutilized. When collected dilute hydrochloric acid (22% HCl) is all transported to the outside, the usage of concentrated hydrochloric acid (35% HCl) is 1.9 tons per hour, and the discharge amount of dilute hydrochloric acid (22% HCl) is 1.5 tons per hour. As a result, costs are required for buying the concentrated hydrochloric acid and treating the dilute hydrochloric acid.

In contrast, in the air pollutant control system 10A shown in FIG. 2, to which the present invention is applied, the usage of concentrated hydrochloric acid is less, i.e., about 1.3 tons per hour. Further, no disposal cost is required.

Second Embodiment

In the air pollutant control system 10B shown in FIG. 3, a portion 48B of the desulfurization wastewater 48, discharged from the desulfurization apparatus 16, is supplied to the hydrochloric acid neutralization tank 30. Then, by diluting the aqueous chloride solution and combustion it in the boiler, it is possible to significantly reduce the amount of treated wastewater to be discharged to the outside.

In the desulfurization wastewater 48, calcium chloride produced by a limestone/gypsum process is present in an aqueous solution (about 20000 ppm). By supplying it to the hydrochloric acid neutralization tank 30, the chloride concentration can be increased. This makes it possible to reduce the amount of concentrated hydrochloric acid to be supplied to 1.0 tons per hour, which is about 20% reduction. The diluted amount is set so as not to affect the boiler operation, and about 55% to 60% may be used as dilution water.

Instead of the desulfurization wastewater 48, a treated wastewater 51B may be supplied to the hydrochloric acid neutralization tank 30 as shown in the air pollutant control system 10C of FIG. 4.

The following describes a comparison between a power generating facility of 600 megawatts that buys concentrated hydrochloric acid according to the present invention (35% HCl) and reutilizes it, and a power generating facility of 600 megawatts that buys conventional concentrated hydrochloric acid and disposes dilute hydrochloric acid (22% HCl) to the outside. Assume that these facilities are operated for 10 years.

In the air pollutant control system 100A shown in FIG. 5 as a conventional facility, the cost for buying concentrated hydrochloric acid is 790 million yen per year, and the cost for treating dilute hydrochloric acid is 410 million yen per year. In contrast, in the air pollutant control system 10A shown in FIG. 2, the cost for buying concentrated hydrochloric acid is 490 million yen per year relative to the conventional facility. This enables a reduction of about 300 million yen per year in the cost for buying concentrated hydrochloric acid, relative to the conventional facility. Further, no cost is required for treating dilute hydrochloric acid. In total, a reduction of 710 million yen per year is achieved relative to the conventional facility.

In the air pollutant control system 10B shown in FIG. 3, the cost for buying concentrated hydrochloric acid is 350 million yen per year. This enables a reduction of about 440 million yen per year in the cost for buying concentrated hydrochloric acid, relative to the conventional facility. Further, no cost is required for treating dilute hydrochloric acid. In total, a reduction of 850 million yen per year is achieved relative to the conventional facility.

Because this estimation is based on ten-year operation, a further reduction is achieved for a longer operation period, e.g., 15 years or 20 years. Further, when dilute hydrochloric acid is disposed to the outside from the conventional facility, an acid-proof tank is required as a storage tank for storing therein the dilute hydrochloric acid within the power generating facility. This significantly increases construction costs of such a conventional facility.

In the present invention, although the foregoing describes a coal combustion boiler using coal as a fuel, the present invention is not limited to this. For example, in an industrial boiler facility that burns a fuel such as refuse-derived fuel (RDF) and industrial waste etc. so as to flue gas containing mercury, concentrated hydrochloric acid may be vaporized to spray hydrogen chloride in an flue gas flue. Further, by neutralizing dilute hydrochloric acid, which is residue resulting from production of the hydrogen chloride, and by burning the fuel containing chloride in the boiler, hydrogen chloride is produced. Then, together with hydrogen chloride sprayed, the mercury in flue gas may be securely reduced.

In small and medium scale industrial boilers also, concentrated hydrochloric acid may be vaporized to produce hydrogen chloride. Further, by neutralizing collected dilute hydrochloric acid and combustion the resultant chloride in the industrial boilers, hydrogen chloride is produced separately, and the production amount of the first hydrogen chloride to be sprayed can be supplemented. This realizes complete recycling within the industrial boiler facilities, thereby significantly improves the recycling efficiency compared with facilities that discharge hydrochloric acid and reutilize it.

According to the present invention, dilute hydrochloric acid discharged as a waste product is neutralized, supplied to a boiler as chloride, and burned to produce hydrogen chloride. Then, together with hydrogen chloride sprayed separately, it is possible to securely reduce mercury in flue gas.

Further, desulfurization wastewater discharged from a desulfurization apparatus is neutralized, and used as an aqueous chloride solution to be burned in the boiler. In this way, the amount of wastewater to be discharged outside can be significantly reduced.

What is claimed is:

1. An air pollutant control system comprising:
    a denitration apparatus that reduces nitrogen oxide in flue gas discharged from an industrial boiler, and injects hydrogen chloride into the flue gas to oxidize mercury;
    a desulfurization apparatus that absorbs sulfur oxide in flue gas thus denitrated;
    a stack from which gas thus desulfurized is discharged outside;
    a hydrogen chloride vaporizer that produces hydrogen chloride with a supply of concentrated hydrochloric acid; and
    a neutralization tank where at least one of dilute hydrochloric acid discharged from the hydrogen chloride vaporizer and the concentrated hydrochloric acid is neutralized with an alkali agent, wherein
    chloride resulting from such neutralization is supplied to a fuel, and then burned in the industrial boiler to produce hydrogen chloride in flue gas, and, together with hydrogen chloride sprayed, the mercury is reduced.

2. An air pollutant control system comprising:
    a spray device that sprays hydrogen chloride into flue gas discharged from a coal combustion boiler;

a denitration apparatus that reduces nitrogen oxide in flue gas into which the hydrogen chloride has been sprayed, and that oxidizes mercury;

an air heater that recovers heat in gas from which the nitrogen oxide has been reduced;

a dust collector that reduces dust in gas from which the heat has been collected;

a desulfurization apparatus that absorbs sulfur oxide in gas from which the dust has been reduced;

a stack from which gas thus desulfurized is discharged outside;

a hydrogen chloride vaporizer that produces hydrogen chloride with a supply of concentrated hydrochloric acid; and a hydrochloric acid neutralization tank where at least one of dilute hydrochloric acid discharged from the hydrogen chloride vaporizer and the concentrated hydrochloric acid is neutralized with an alkali agent, wherein neutralized chloride is supplied to a coal feeder, mixed with coal, and then burned in the coal combustion boiler, so as to produce hydrogen chloride in flue gas, and, together with hydrogen chloride sprayed, the mercury is reduced.

3. The air pollutant control system according to claim 1, wherein desulfurization wastewater discharged from the desulfurization apparatus, or treated wastewater obtained by removing heavy metals from the desulfurization wastewater is supplied to the hydrochloric acid neutralization tank.

4. The air pollutant control system according to claim 1, further comprising a hydrogen chloride monitor that measures a concentration of hydrogen chloride between the boiler and the denitration apparatus, wherein the chloride is supplied under feedback control.

5. The air pollutant control system according to claim 1, wherein flue gas between the boiler and the denitration apparatus has a chlorine concentration being equal to or less than 1000 ppm.

6. A method for removing mercury in flue gas, the method comprising:

removing nitrogen oxide in flue gas discharged from an industrial boiler, and spraying hydrogen chloride into the flue gas, so as to oxidize mercury;

neutralizing with an alkali agent dilute hydrochloric acid discharged after the hydrogen chloride is produced; and supplying neutralized chloride to a fuel, and then combusting the chlorine in the boiler to produce hydrogen chloride in flue gas, and removing the mercury together with hydrogen chloride sprayed.

* * * * *